US012462020B2

(12) United States Patent
Strogov et al.

(10) Patent No.: US 12,462,020 B2
(45) Date of Patent: Nov. 4, 2025

(54) FIRMWARE PROTECTION FOR INDUSTRIAL CONTROL SYSTEMS

(71) Applicant: Acronis International GmbH, Schaffhausen (CH)

(72) Inventors: Vladimir Strogov, Singapore (SG); Sergey Ulasen, Singapore (SG); Aliaksei Dodz, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 236 days.

(21) Appl. No.: 18/345,088

(22) Filed: Jun. 30, 2023

(65) Prior Publication Data

US 2025/0005143 A1  Jan. 2, 2025

(51) Int. Cl.
*G06F 21/55* (2013.01)
*G06F 21/56* (2013.01)
*G06F 21/57* (2013.01)

(52) U.S. Cl.
CPC .......... *G06F 21/552* (2013.01); *G06F 21/564* (2013.01); *G06F 21/572* (2013.01)

(58) Field of Classification Search
CPC .... G06F 21/552; G06F 21/564; G06F 21/572; G06F 21/554; G06F 21/566
See application file for complete search history.

(56) References Cited

U.S. PATENT DOCUMENTS

| | | | |
|---|---|---|---|
| 8,181,247 B1 * | 5/2012 | Pavlyushchik | G06F 21/566 726/22 |
| 11,416,612 B2 | 8/2022 | Strogov et al. | |
| 2005/0183137 A1 * | 8/2005 | Jooste | G06F 21/53 726/4 |
| 2012/0255017 A1 * | 10/2012 | Sallam | G06F 9/45558 726/24 |
| 2015/0346706 A1 * | 12/2015 | Gendelman | G05B 23/0208 700/79 |
| 2016/0110567 A1 * | 4/2016 | Rooyakkers | G06F 21/604 361/752 |
| 2020/0117806 A1 * | 4/2020 | Callaghan | G06F 21/575 |
| 2020/0202008 A1 * | 6/2020 | Pfleger de Aguiar | G06F 11/3485 |
| 2021/0034031 A1 * | 2/2021 | Acharya | G06F 21/55 |
| 2021/0200867 A1 * | 7/2021 | Schmugar | G06F 21/572 |
| 2023/0079418 A1 * | 3/2023 | Hamilton | H04L 63/1408 726/22 |
| 2023/0137747 A1 * | 5/2023 | Sims | G06F 21/566 726/23 |

FOREIGN PATENT DOCUMENTS

CN  115097807  9/2022

\* cited by examiner

*Primary Examiner* — Tod R Swann
*Assistant Examiner* — Amir Mahdi Hajiabbasi
(74) *Attorney, Agent, or Firm* — ESPE Legal Consultancy FZ-LLC (57) ABSTRACT

Systems and methods for firmware protection of industrial control systems. A kernel-level agent operating at a kernel mode intercepts a request to the resource, collects data associated with the intercepted request, and sends the collected data to a security service. A security service receives the collected data, analyzes the collected data to determine a verdict, and sends the verdict to the kernel-level agent. The kernel-level agent then executes a security action for the resource based on the verdict.

20 Claims, 4 Drawing Sheets

FIRMWARE PROTECTION FOR INDUSTRIAL CONTROL SYSTEMS

TECHNICAL FIELD

Embodiments relate generally to industrial control systems. More particularly, embodiments relate to firmware protection for industrial control systems.

BACKGROUND

Industrial control systems (ICS) generally include electronic control systems and associated instrumentation, which include the devices, systems, networks, and controls used to operate and automate industrial processes. Some industrial control systems endpoints (e.g. physical or virtual devices or hardware of the industrial control system) are vulnerable to cyberattacks because their firmware files can be accessed by administrators. This leaves endpoints open to exploitation by hackers seeking to gain unauthorized access to the control systems, compromise endpoint functionality, or steal sensitive data. The potential consequences of such attacks can be severe, including disruption of critical infrastructure, loss of productivity, and compromise of public safety.

Existing solutions typically operate to mitigate industrial control systems attacks only after an attack has been identified. Therefore, there is a need for systems and methods of endpoint self-protection that harden industrial control systems against cyberattacks to not only mitigate against attacks but prevent attacks.

SUMMARY

Embodiments described or otherwise contemplated herein substantially meet the aforementioned needs of the industry. Embodiments described herein include systems and methods of endpoint self-protection that harden industrial control systems against cyberattacks.

In a feature and advantage of embodiments, administrators and companies can better secure industrial control systems and prevent unauthorized access to firmware files compared to existing solutions. The self-protection-like methods provide an additional layer of defense that complements existing security measures, making it more difficult for attackers to compromise industrial control systems. Accordingly, embodiments provide improved system resilience and reduced risk of cyber incidents.

In another feature and advantage of embodiments, systems and methods protect against unauthorized modification or replacement of firmware files, which can prevent attackers from gaining full control over the industrial control system.

In another feature and advantage of embodiments, unlike existing solutions which rely on indicators of compromise or attack to collect data after a security event has been identified, embodiments perform live monitoring at the kernel level of the operating system. Such monitoring allows embodiments to identify firmware resources by their hash content or path and apply proprietary rules for each specific ICS.

In another feature and advantage of embodiments, self-protection-like methods include machine learning (ML) analysis, file rules, and other security actions that can prevent attacks before they occur. Embodiments therefore implement a proactive approach compared to existing solutions' reactive approach. This is a significant advantage over existing solutions, which rely primarily on post-attack data collection and mitigation.

In another feature and advantage of embodiments, monitoring the system at the initialization stage of ICS allows for identification of the paths and modules of the ICS that are loaded. Accordingly, embodiments protect the ICS resources right after initialization of the ICS. This provides an additional layer of defense against cyberattacks, as it enables the system to detect and prevent attacks at an early stage.

In another feature and advantage of embodiments, comprehensive live monitoring and self-protection capabilities offers a higher level of security and resilience than existing solutions. This can help prevent costly and damaging cyber incidents that can disrupt critical infrastructure and compromise public safety.

In an embodiment, a method for protecting an Industrial Control System (ICS) resource comprises intercepting, by a kernel-level agent operating at a kernel mode, a request to the resource, wherein the request is initiated from a user mode of the ICS; collecting, by the kernel-level agent, data associated with the intercepted request to the resource; sending, by kernel the kernel-level agent, the data to a security service, the security service operating at a user mode; analyzing, by the security service, the collected data to determine a verdict; sending, by the security service, the verdict to the kernel-level agent; and executing, by the kernel-level agent, at least one security action for the resource based on the verdict received from the security service.

In one aspect, the resource includes at least one of firmware, ICS files, firmware modules, and firmware libraries.

In one aspect, intercepting the request is performed by at least one of a kernel driver or a file system filter driver.

In one aspect, the request is intercepted based on a file path of the resource.

In one aspect, the analysis performed by the security service comprises at least one of: using anti-malware signatures to identify a potentially malicious file; applying a file rule to the data to identify a potential threat; or using a machine learning model to analyze the data.

In one aspect, the security service is located on each Programmable Logic Controller (PLC) of the ICS.

In one aspect, the at least one security action includes at least one of: changing the request from read-write mode to read-read mode; denying the request; allowing the request; allowing the request and preventing modification of the resource; generating a backup copy of the resource before allowing the request; allowing the request and performing copy on write-delayed snapshotting; or performing remediation of the resource.

In one aspect, a method further comprises identifying the resource prior to intercepting the request to the resource.

In one aspect, identifying the resource includes applying a rule specific to the ICS.

In one aspect, identifying the resource includes monitoring initialization of the ICS.

In an embodiment, a system for protecting an Industrial Control System (ICS) resource from a potentially malicious application comprises a kernel-level agent operating at a kernel mode, the kernel-level agent configured to: intercept a request to the resource from the potentially malicious application, wherein the potentially malicious application operates in a user mode of the ICS, collect data associated with the intercepted request to the resource, send the data to a defense service, and execute at least one security action for the resource based on a verdict; a defense service operating at the user mode, the defense service configured to: receive the collected data; analyze the collected data to determine the verdict, and send the verdict to the kernel-level agent.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments described herein protect industrial control system vulnerabilities. In an embodiment, a programmable logic controller of an ICS can be associated with multiple operating systems, including both WINDOWS and LINUX. For example, an administrator of a WINDOWS-based endpoint can have access via the LINUX portion of the PLC to LINUX-based components and LINUX files, because both systems are in the PLC. Accordingly, on a WINDOWS machine endpoint, the administrator can have read/write access to the Virtual Machine Manager (VMM) binary, as well as LINUX files such as the GRand Unified Bootloader (GRUB) configuration file, and CPU.elf (executable and linkable) file. Access to such key files allows an administrator (or a compromised administrator account or device) to modify almost any file in the ICS. Embodiments described herein therefore operate on the kernel level to prevent unauthorized access to the ICS.

Figure 1:
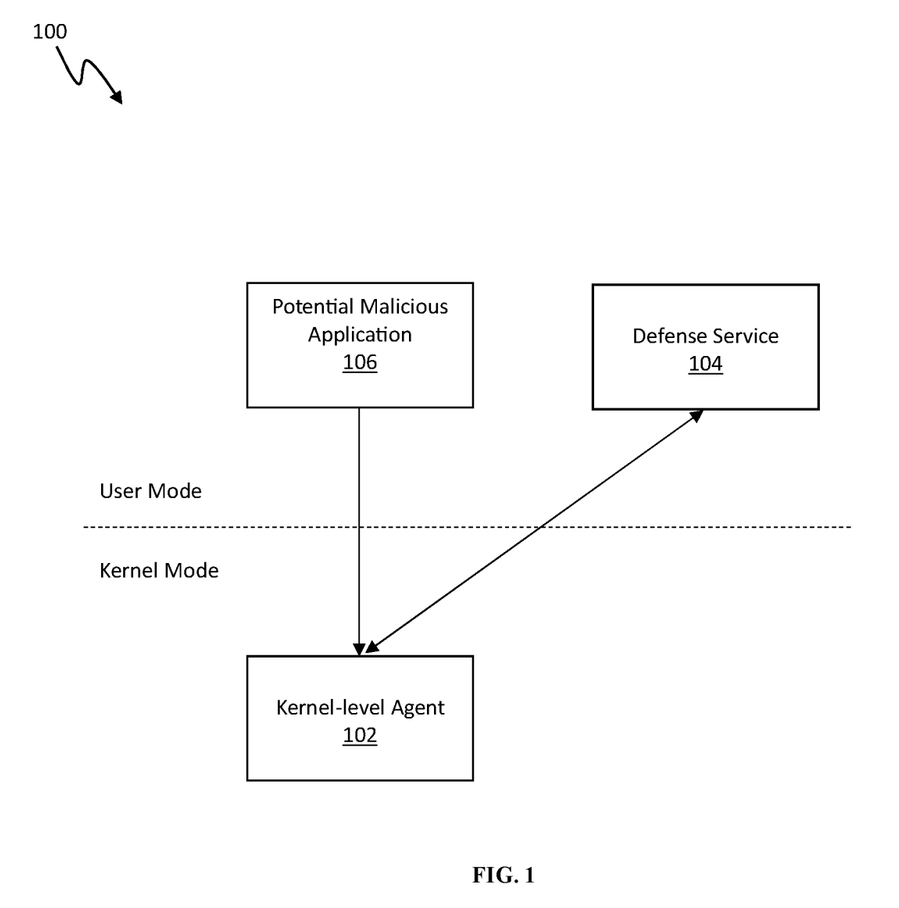
FIG. 1 is a block diagram of a system for firmware protection of an industrial control system, according to an embodiment.

Referring to FIG. 1, a block diagram of a system 100 for firmware protection of an industrial control system is depicted, according to an embodiment. System 100 generally comprises a kernel-level agent 102 and a defense service 104 for protecting against a potential malicious application 106.

System 100 includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

FIG. 1 depicts a separation between kernel mode and user mode. In general, while processes run in kernel mode, they have direct and unrestricted access to system 100 resources. In contrast, user mode is a non-privileged mode for user programs.

Potential malicious application 106 operates in user mode. Potential malicious application 106 can send malicious requests to components of system 100, such as kernel-level components like the kernel driver or file system. Accordingly, malicious requests from potential malicious application 106 originate in the user mode. Requests of system by potential malicious application 106 components can include firmware, ICS files, firmware modules, and firmware libraries. As described herein, system 100 therefore prevents against the malicious requests of potential malicious application 106.

Figure 2:
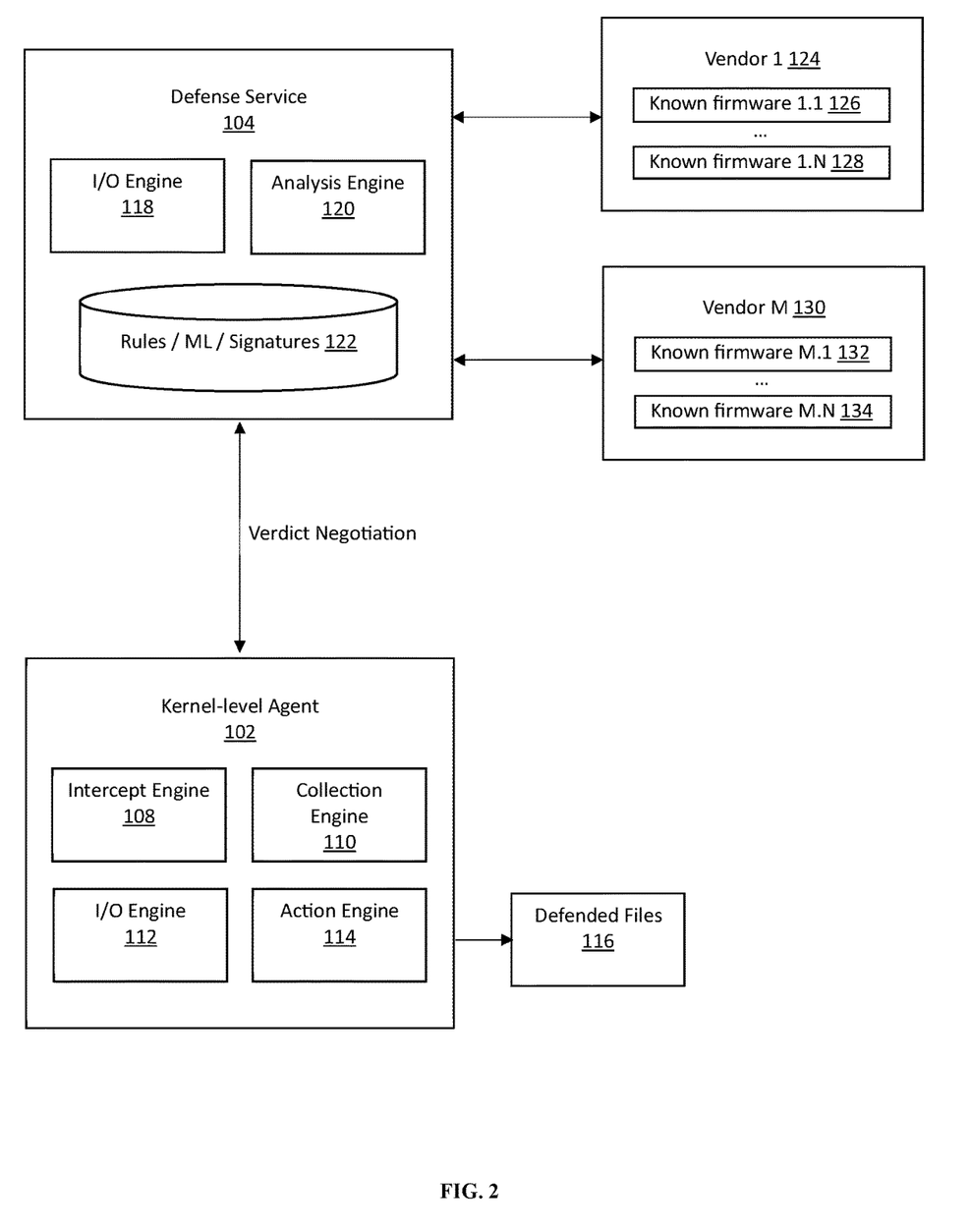
FIG. 2 is a block diagram of a kernel-level agent and a defense service of the system for firmware protection of an industrial control system of FIG. 1, according to an embodiment.

Referring also to FIG. 2, a block diagram of kernel-level agent 102 and defense service 104 of system 100 are depicted further, according to an embodiment.

Kernel-level agent 102 operates in kernel mode. In an embodiment, the kernel manages the system resources, including file systems, processes, and physical devices. The kernel provides applications with system services such as I/O management, virtual memory, and scheduling. The kernel coordinates interactions of all user processes and system resources. The kernel assigns priorities, services resource requests, and services hardware interrupts and exceptions.

The kernel schedules and switches threads, pages memory, and swaps processes. Accordingly, kernel-level agent 102 can be a kernel driver.

In an embodiment, kernel-level agent 102 can be a file system filter driver. For example, a file system filter driver is a driver that modifies the behavior of a file system as a kernel-mode component. A file system filter driver can filter I/O operations for one or more file systems or file system volumes.

Kernel-level agent 102 therefore operates at the level of kernel-level requests. In an embodiment, kernel-level agent 102 includes an intercept engine 108, a collection engine 110, an input/output (I/O) engine 112, and an action engine 114.

Intercept engine 108 is configured to intercept a request from potential malicious application 106. For example, prior to execution of the request, intercept engine 108 can hook or otherwise intercept the request for further analysis as to potential maliciousness. In an embodiment, kernel-level agent 102 operates as an ObCallbacks subscriber. An ObRegisterCallbacks routine and callback can restrict requested access rights during an open process action intercept. Intercept engine 108 can intercept requests of system resources including firmware, ICS files, firmware modules, and firmware libraries.

Intercept engine 108 is further configured for live monitoring of the kernel level. Accordingly, intercept engine 108 can determine the respective paths to firmware files and intercept any request to those paths. In an embodiment, at initialization, respective file paths of the resources are obtained. Accordingly, intercept engine 108 is configured to intercept a request based on the file path of the resource.

In an embodiment, firmware resources are identified by monitoring the system starting at initialization of the ICS. For example, firmware resources can be identified according to a list of resources to monitor. As described above, firmware resources can include LINUX-based components (accessible via the PLC which includes both WINDOWS and LINUX associations, in an embodiment). For example, a list can include known files like VMM binary, GRUB configuration file, and CPU.elf. At initialization, the resource locations of the firmware files in the list can be identified (i.e. using a file search).

In an embodiment, firmware resources can be dynamically identified. In an embodiment, functionality of firmware resources can be identified by the ICS system operation (including at initialization and later). If a particular firmware File A operates on ICS hardware, File A can be added for intercepting. For example, interactions with certain all or certain hardware interaction can be monitored, and thus, firmware can be identified. Accordingly, firmware files can be identified by monitoring and analyzing ICS operations.

In an embodiment, resource behavior is monitored starting from initialization by intercept engine 108. Behavior can then be analyzed in the user mode (e.g. by defense service 104). Thus, in certain embodiments, kernel-level agent 108 and defense service 104 are in communication outside of a system resource intercept. More particularly, kernel-level agent 108 is configured to collect data other than intercept requests (e.g. behavioral data for subsequent analysis and identification of firmware by defense service 104 and iterative application of firmware to intercept by kernel-level agent 102).

Likewise, in an embodiment, intercept engine 108 can determine respective firmware resources for which to intercept according to hash content. For example, firmware content can be pre-hashed. Accordingly, when a request is intercepted, the request content can be hashed. If the hash matches known hash content to protect according to the pre-hash, intercept engine 108 can be configured to further process the request (i.e. data collection and integration with defense service 104 for a security verdict related to that request).

In an embodiment, intercept engine 108 can determine respective firmware resources by use of Unified Extensible Firmware Interface (UEFI) data. In an embodiment, UEFI data defines the architecture of the platform firmware used for booting and its interface for interaction with the operating system. Accordingly, UEFI data can be used to determine the nature of loaded resources at the stage of loading PLC and thus the particular firmware resources for which to intercept. For example, UEFI modules can verify system loading modules at a pre-boot stage. Thus, firmware resources from the loading modules can be identified. In another embodiment, the loading of modules can be controlled by UEFI modules in addition to the existing firmware. UEFI modules are therefore further configured to check black or white lists of module signatures or signatures of known vendors, and in operation with intercept engine 108, firmware resources can be further identified. Embodiments are able to provide WINDOWS-based firmware protection and LINUX-based firmware protection through a PLC that includes both WINDOWS components and LINUX components.

Thus, in embodiments, intercept engine 108 is configured to identify firmware resources using any number of methods, including by operation at loading or pre-boot, hashing, signature checking, and using any other suitable additional characteristics: length of the file, naming characteristics, metadata characteristics, and so on.

In an embodiment, intercept engine 108 can intercept based on the specific control system being protected. For example, certain resources for intercepting can be applied by one or more rules within intercept engine 108. The specific rules for intercepting can be different based on the type of control system under protection. Firmware intercepts can therefore be varied based on the type of ICS; an ICS operating in association with a nuclear power plant may have more strict controls (and thus intercept for more firmware) than an ICS operating in association with HVAC for a single building. Accordingly, intercept engine 108 can be configured to intercept by applying rules specific to every ICS.

Collection engine 110 is configured to collect data associated with the intercepted request. For example, collection engine 110 can collect data including identification of the requestor such as potential malicious application 106 and any associated hardware, the type of request, the frequency of request, the system resources requested, and so on. In embodiments, collection engine 110 can collect data prior to interception of the request from potential malicious application 106, during the interception of the request, and/or after interception of the request.

For example, collection engine 110 can be configured to collect data upon initialization of system 100. Data can be collected in a cache or other temporary repository. Upon intercept of a request by intercept engine 108, the data collected before the request can be associated with the request, and, once sent, deleted from the cache.

In an embodiment, various time checkpoints can be used to delete the collected data from cache so that data overwhelm is avoided. For example, for a time 0 to 5, data can be collected. If an intercept does not occur, the data collected from 0 to 5 can be deleted from cache. Then, data from time 6 to 10 is collected. If an intercept occurs after t=10, and is associated with the request, the data can be associated with the request and sent to defense service 102 (as will be described), and deleted from cache.

In an embodiment, data such as indicators of compromise (IOCS) or indicators of attack (IOA) are collected by collection engine 110. In general, IOCS and IOA data are collected after a security event. However, as mentioned, collection engine 110 can be configured to collect data before a request such that the data collected before the intercept is stored and subsequently associated with the request. Likewise, collection engine 110 can be configured to collect data during the intercept. In embodiments, such data collected before the intercept and during the intercept can be advantageous in the security verdict analysis.

In an embodiment, collection engine 110 can further filter, aggregate, or otherwise package the data collected for subsequent transmission. In other embodiments, collection engine 110 does not package the data such that all raw data can be subsequently transmitted.

I/O engine 112 is configured to communicate with defense service 102. Accordingly, I/O engine 112 can transmit data collected by collection engine 110 to defense service 104 for determination of a security verdict. In embodiments, I/O engine 112 can further receive communications from defense service 104, including a security verdict associated with potential malicious application 106.

Action engine 114 is configured to implement at least one security action. The security action can include allowing or denying the intercepted request. In embodiments, action engine 114 can take a security action on system resources based on the security verdict, such as protecting defended files 116. More particularly, the at least one security action can include at least one of: changing the request from read-write mode to read-read mode, denying the request, allowing the request, allowing the request and preventing modification of the resource, taking immediate backup copy of the resource before allowing the request, allowing the request and performing copy on write-delayed snapshotting, and performing remediation of the resources. Accordingly, action engine 114 can operate on defended files 116 as well as additional resources of system 100.

Action engine 114 can further quarantine existing files and check for a new file. Embodiments can further quarantine previous files, and in the case new firmware has a critical vulnerability, roll back the firmware to a previous safe version of the file. In an embodiment, a new resource can be sandboxed to determine its behavior after identifying the file and monitoring for requests related to the file, before releasing the file as deployed into the ICS.

Defense service 104 operates in user mode. In an embodiment, defense service 102 can be instantiated on every Programmable Logic Controller (PLC) of system 100. Accordingly, in embodiments, system 100 operates to protect against security threats without any common cloud reputations.

Defense service 104 generally comprises an I/O engine 118, an analysis engine 120, and a repository 122.

I/O engine 118 is configured to communicate with kernel-level agent 102. For example, I/O engine 118 can be communicatively coupled to I/O engine 112 for verdict negotiation. In particular, in an embodiment, I/O engine 118 is configured to receive data associated with the intercepted request. I/O engine 118 can further communicate to kernel-level agent 102, including indication of a security verdict associated with potential malicious application 106.

Analysis engine 120 is configured to analyze the data received from kernel-level agent 102 and generate a security verdict. In embodiments, analysis engine 120 is configured to interface with repository 122 as part of the analysis and generation of the security verdict.

Repository 122 generally comprises a source of data for application to the data received from kernel-level agent 102. Though depicted as a single repository 122, repository 122 can comprise separate or combined repositories or structures, such as a rules repository, a machine learning model, and/or a signature repository.

In an embodiment, repository 122 can include a plurality of file rules. Accordingly, analysis engine 120 can apply one or more file rules to the collected data to identify potential threats. For example, if the request is in violation of a particular rule for the firmware that is the subject of the request, the request can be indicative of malware. For example, file rules can include specific components or applications. In other embodiments, file rules can include names, paths, hashes, signatures, or based on any other suitable characteristic.

In an embodiment, repository 122 can include a plurality of malware or antimalware signatures. Accordingly, analysis engine 120 can apply one or more signatures to the collected data to identify potential threats. For example, if the signature of the requestor matches a signature of known requestors of malware, the request can be indicative of malware. In another example, if one or more characteristics of the sender's file, process, or application matches a corresponding signature of known malware, the request can be indicative of malware. For example, an application can be compared against a black list or white list for evidence of malware.

In an embodiment, according to a revert scheme of firmware protection, hash content is used to identify firmware that includes characteristics of malware and firmware that does not include characteristics of malware. For example, analysis engine 120 can apply hashing on a firmware file itself (such that the file or data required of the hashing are collected by collection engine 110). In such embodiments, repository 122 can include a plurality of hashed values including those indicative of malware and those of benign files for comparison against the hashing of the firmware file.

In an embodiment, repository 122 can include a machine learning model. The machine learning model can be trained using a training dataset of data related to the resources of system 100. For example, data including a type of firmware, a type of request, a type of resource, an action of the requesting application, and so on, can be used as training data. In an embodiment, such features are represented as a feature vector.

The machine learning model can be configured to learn to identify malicious files based on the trained data. In an embodiment, pre-execution static analysis can be utilized based on machine learning models. For example, a ML model can be trained on attributes extracted from ELF files or other formats that are applicable to firmware. For example, the ML model can be trained on a list of imported functions, existence of files with high entropy, complication attributes, or any other suitable feature that can be extracted from the binary file. Static-analysis methods are therefore used to parse and disassemble portable executable files and create attribute trees, including certificates, headers, libraries, imports, name, size and other attributes.

In an embodiment, a ML model can be trained on non-firmware files. For example, a ML model can be trained on attributes extracted from malware. Static and dynamic analysis tools can be used to extract feature vectors to train the ML model to learn to identify of-interest firmware potentially implicated by malware, and which is to be monitored. In another example, a ML model can be trained on attributes extracted from system files other than firmware. Feature vectors of system files can likewise be used to identify of-interest firmware. In an embodiment, firmware files and other files can be identified by one or more trained models in the pre-boot environment.

In an embodiment, the machine learning model can utilize a behavioral analysis. For example, the machine learning model can be focused on who and what can be authorized to modify given firmware files based on behaviors. In one embodiment, a machine learning model can be therefore trained on behaviors of firmware files. Accordingly the trained machine learning model can be used to estimate whether certain executable behaviors are benign or malware and thus whether the executable can modify firmware.

In an embodiment, the machine learning model can be utilized for a statistical analysis. For example, analysis engine 120 can utilize a ML repository to determine how a new firmware file differs from the existing firmware. For example, a machine learning model can be trained for static file analysis based on differences between firmware. In an embodiment, a ML model can be trained on existing firmware binary modules (e.g. known firmware from vendors). Analysis engine 120 can therefore determine differences from existing verified binary modules (e.g. using a set of attributes) of known firmware.

For example, in an embodiment, defense service 104 can be operably coupled to vendor devices. For example, as illustrated in FIG. 2, defense service 104 is operably coupled to a plurality of vendors, as depicted as Vendor 1 124 to Vendor M 130. Vendor 1 124 can communicate a plurality of known firmware (e.g. known firmware 1.1 126 to known firmware 1.N 128) to defense service 104 for incorporation in repository 122. Likewise, Vendor M 130 can communicate a plurality of known firmware (e.g. known firmware M.1 132 to known firmware M.N 134) to defense service 104 for incorporation in repository 122. In an embodiment, Vendors 1 to M 124 and 130 can communicate the firmware binaries themselves, portions of the known binaries, and/or features of the known binaries.

More particularly, in an embodiment, a machine learning model can be built (e.g. repository 122) based on existing firmware binary modules. The machine learning model can be trained based on a set of attributes of known firmware. Then, as mentioned above, analysis engine 120 is further configured to determine how an of-interest firmware binary differs from existing verified binary modules of known firmware.

In embodiments, multiple ML models can be utilized to analyze the request. For example, in an ensemble, a first model can be directed to an algorithm related to the file of the request. A second model can be directed to the hardware resources of the request. A third model can be directed to the action of the request. The algorithms utilized in the different models can be integrated to a single verdict. In embodiments, the multiple ML models of the ensemble can be trained using the same or different training data.

Accordingly, analysis engine 120 can utilize machine learning techniques to analyze the collected data and determine a verdict.

In an embodiment, multiple repository 122 embodiments can be utilized together. For example, analysis engine 120 can be configured to analyze the data using both machine learning and a signature (or ML and a signature and a rule, etc.). Accordingly, if both analyses are the same (e.g. the ML analysis is indicative of malware and the signature analysis is indicative of malware) analysis engine 120 can return a verdict of malware.

However, if the analysis differs (e.g if the ML analysis is indicative of malware but the signature analysis is not indicative of malware) analysis engine 120 can return a verdict of malware. In other words, if at least one of the analyses generates a determination of malware, the verdict can be returned to kernel-level agent 102 as malware for appropriate action by action engine 114. More particularly, in embodiments, the analysis can take the "worst" verdict so as to prevent against potential false negatives of the other verdicts.

In other embodiments, file rules, signatures, and machine learning analyses can be used in combination such that each analysis can be used in determining a final verdict. In one example, in a verdict determination using file rules, signatures, and machine learning, if any two of the three (or all three) analyses determine an indication of malware, the final verdict is indicative of malware. In contrast, if none or one of the analyses determine an indication of malware, the final verdict is not indicative of malware.

In another embodiment, the various analyses can be given different weightings. For example, a file rule analysis can be given a [0.25] weighting, a signature analysis can be given a weighting, and machine learning analysis can be given a [0.5] weighting. The determination can be made relative to a threshold, such as whether the indication of malware is more than 0%, 25%, 30%, 50%, 75%, and so on. Other weightings, thresholds, and combined analysis determinations can likewise be made.

Figure 3:
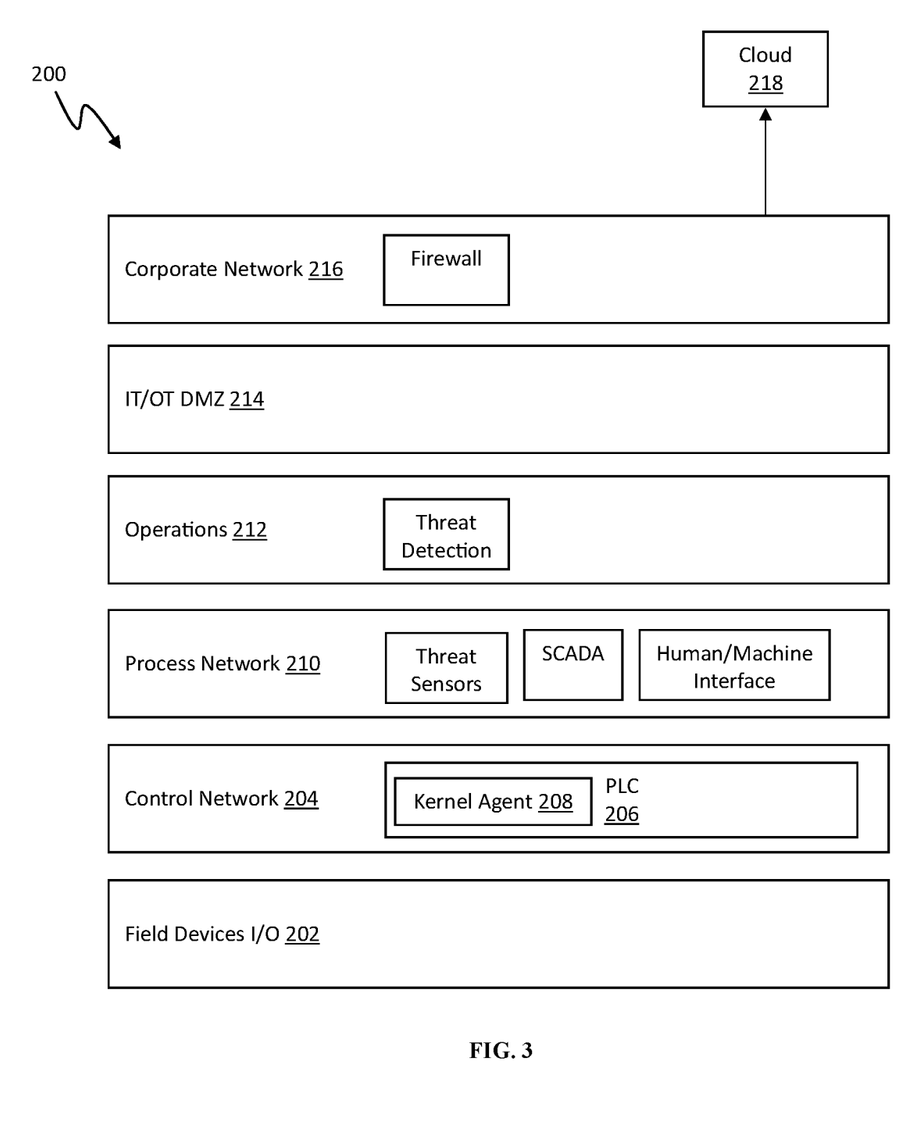
FIG. 3 is a block diagram of an industrial control system, according to an embodiment.

Referring to FIG. 3, a block diagram of an industrial control system 200 (ICS 200) is depicted, according to an embodiment. Industrial control system 200 generally comprises field devices I/O 202, control network 204, process network 210, operations 212, information technology/operational technology 214, corporate network 216, and cloud 218. Although renumbered for ease of discussion, in an embodiment, system 100 as depicted and described with respect to FIGS. 1-2 is included in control network 204.

Field devices I/O 202 can include a plurality of sensors, actuators, solenoids, transducers, breakers, and other similar devices. Field devices I/O 202 therefore receives data related to ICS 200 according to the particular sensor(s) implemented.

Control network 204 includes one or more computing devices configured to control field devices I/O 202. As explained above, control network 204 can be implemented according to system 100 and can include a PLC 206 and a kernel agent 208. Specifically, kernel agent 208 (i.e. kernel-level agent 102) is illustrated as a component of PLC 206, which can also include defense service 104. In an embodiment, PLC 206 includes components for multiple operating system endpoints. In one example, PLC 206 can include both WINDOWS embedded components and LINUX embedded components on which kernel agent 208 operates. In an embodiment, PLC 206 can implement a virtual machine manager configured to interface with field devices I/O 202. Control network 204 is operably coupled to process network 210.

Process network 210 includes one or more computing devices configured to process data related to field devices I/O 202 via control network 204. In an embodiment, process network 210 can include a Supervisory Control and Data Acquisition (SCADA) component. SCADA is a computerbased system for gathering and analyzing real-time data to monitor and control equipment that deals with critical and time-sensitive materials or events. In an embodiment, process network 210 can include a human/machine interface (HMI) as generally a control panel for a human user to interact with PLC 206. In certain embodiments, process network 210 can further include threat sensors. Process network 210 is operably coupled to operations 212.

Operations 212 includes one or more computing devices configured to process operations of the industrial network (e.g. field devices I/O 202, control network 204, process network 210). In an embodiment, operations 212 can implement security components including threat detection. Threat detection can utilize threat sensors from process network 210 to detect threats to ICS 200. Operations 212 is operably coupled to IT/OT DMZ 214

Information technology/operational technology demilitarized zone (IT/OT DMZ) 214 is responsible for isolating the industrial network (e.g. operations 212 and below) from corporate network 216. As such, IT/OT DMZ 214 can utilize threat detection from operations 212.

Corporate network 216 comprises one or more computing devices configured for users to interact with data related to ICS 200. For example, corporate network 216 users can implement applications on corporate network 216 using data and processed information related to field devices 202.

Cloud 218 provides a network interface to ICS 200. Cloud 218 can include networked computing components that allow access to select components of ICS 200 through the components described herein. For example, vendor devices can communicate with ICS 200 using cloud 218 (typically via the firewall of corporate network 216).

Figure 4:
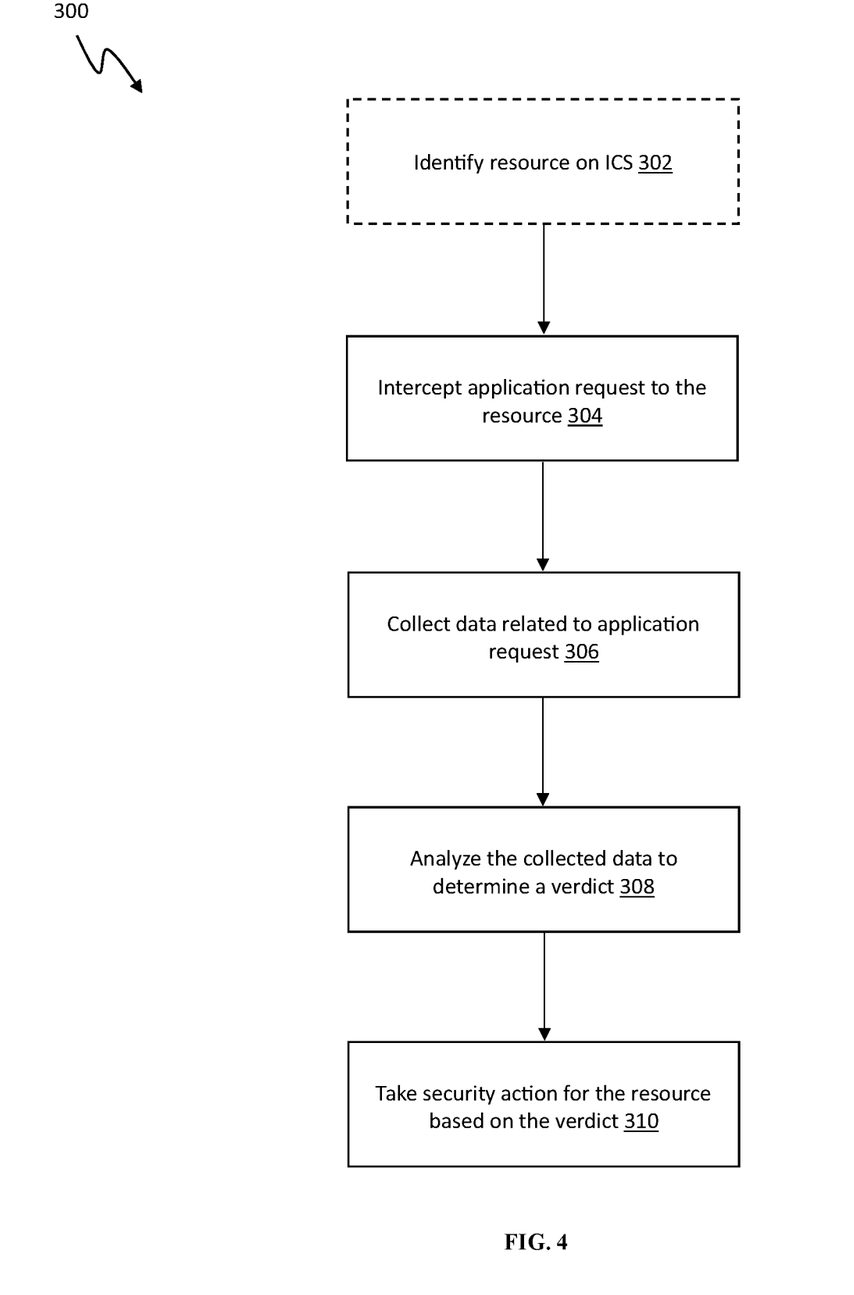
FIG. 4 is a flowchart of a method for firmware protection of an industrial control system, according to an embodiment.

Referring to FIG. 4, a flowchart of a method 300 for firmware protection of an industrial control system is depicted, according to an embodiment. Method 300 can be implemented by system 100 or system 200. Reference to components of system 100 are made in discussion of FIG. 4 for ease of explanation.

Optionally, at 302, a resource is identified on the ICS. For example, kernel-level engine 102, operating at the kernel mode level, can identify one or more resources to protect. Resources can include firmware or other files associated with firmware. In an embodiment, intercept engine 108 can identify the resource.

At 304, a resource request is intercepted from an application. For example, kernel-level engine 102 (e.g. via intercept engine 108) can intercept a request from potential malicious application 106 at the kernel mode level. In an embodiment, the request from potential malicious application 106 originates at the user mode level. The request can be related to one or more resources of the ICS, such as a firmware resource like firmware itself, an ICS file, a firmware module, or a firmware library.

At 306, data related to the request is collected. For example, kernel-level agent 102 (e.g. via collection engine 110) can collect data associated with the intercepted request. In an embodiment, data collected can include data before, during, and after the request is intercepted.

At 308, the collected data is analyzed to determine a verdict related to the intercepted request. For example, kernel-level agent 102 can communicate, using I/O engine 112, the data collected by collection engine 110 to defense service 104. I/O engine 118 of defense service 104 can receive the collected data. Further, defense service 104 can analyze the collected data using analysis engine 120. In an embodiment, analysis engine 120 can utilize repository 122 as part of the analysis. Analysis engine 120 thus returns a verdict.

At 310, a security action is taken. For example, defense service, via I/O engine 118, can communicate the verdict to kernel-level agent 102. I/O engine 112 of kernel-level agent 102 can receive the verdict and communicate the verdict to action engine 114. Action engine 114 can determine one or more actions to take based on the verdict, and execute the one or more actions in order to protect the ICS, including, for example, defended files 116. Method 300 therefore provides firmware protection of an industrial control system.

The invention claimed is:

1. A method for protecting an Industrial Control System (ICS) resource, the ICS comprising a plurality of Programmable Logic Controllers (PLCs), the method comprising:
  at an initialization stage of the ICS, monitoring the ICS to determine a file path of the resource and a functionality of the resource by a kernel-level agent operating at a kernel mode;
  dynamically identifying, by the kernel-level agent, the resource prior to intercepting a request to the resource based on the functionality of the resource;
  intercepting, by the kernel-level agent operating at the kernel mode, a request to the resource based at least on the file path of the resource, wherein the request is initiated from a user mode of the ICS;
  collecting, by the kernel-level agent, data associated with the intercepted request to the resource;
  sending, by kernel the kernel-level agent, the data to a security service, the security service operating at a user mode, wherein the security service is located on each PLC of the plurality of PLCs of the ICS;
  analyzing, by the security service, the collected data to determine a verdict;
  sending, by the security service, the verdict to the kernel-level agent; and
  executing, by the kernel-level agent, at least one security action for the resource based on the verdict received from the security service.

2. The method of claim 1, wherein the resource includes at least one of firmware, ICS files, firmware modules, and firmware libraries.

3. The method of claim 1, wherein intercepting the request is performed by at least one of a kernel driver or a file system filter driver.

4. The method of claim 1, wherein the analysis performed by the security service comprises at least one of:
  using anti-malware signatures to identify a potentially malicious file;
  applying a file rule to the data to identify a potential threat; or
  using a machine learning model to analyze the data.

5. The method of claim 1, wherein the at least one security action includes at least one of:
  changing the request from read-write mode to read-read mode;
  denying the request;
  allowing the request;
  allowing the request and preventing modification of the resource;
  generating a backup copy of the resource before allowing the request;
  allowing the request and performing copy on write-delayed snapshotting; or
  performing remediation of the resource.

6. The method of claim 1, wherein dynamically identifying the resource includes applying a rule specific to the ICS.

7. A system for protecting an Industrial Control System (ICS) resource from a potentially malicious application, the ICS comprising a plurality of Programmable Logic Controllers (PLCs), the system comprising:
- at least one microprocessor;
- a kernel-level agent operating at a kernel mode, the kernel-level agent comprising a set of program instructions stored in memory that, when executed by the at least one microprocessor, cause the at least one microprocessor to:
  - at an initialization stage of the ICS, monitor the ICS to determine a file path of the resource and a functionality of the resource,
  - dynamically identify the resource prior to intercepting a request to the resource based on the functionality of the resource,
  - intercept a request to the resource from the potentially malicious application based at least on the file path of the resource, wherein the potentially malicious application operates in a user mode of the ICS,
  - collect data associated with the intercepted request to the resource,
  - send the data to a defense service, and
  - execute at least one security action for the resource based on a verdict; and
- a defense service operating at the user mode, the defense service located on each PLC of the plurality of PLCs of the ICS, the defense service configured to:
  - receive the collected data;
  - analyze the collected data to determine the verdict, and send the verdict to the kernel-level agent.

8. The system of claim 7, wherein the resource includes at least one of firmware, ICS files, firmware modules, and firmware libraries.

9. The system of claim 7, wherein the kernel-level agent is at least one of a kernel driver or a file system filter driver.

10. The system of claim 7, wherein the defense service is configured to analyze the collected data to determine the verdict includes at least one of:
- using anti-malware signatures to identify a potentially malicious file;
- applying a file rule to the data to identify a potential threat; or
- using a machine learning model to analyze the data.

11. The system of claim 7, wherein the at least one security action includes at least one of:
- changing the request from read-write mode to read-read mode;
- denying the request;
- allowing the request;
- allowing the request and preventing modification of the resource;
- generating a backup copy of the resource before allowing the request;
- allowing the request and performing copy on write-delayed snapshotting; or
- performing remediation of the resource.

12. The system of claim 7, wherein the kernel-level agent is further configured to dynamically identify the resource including by applying a rule specific to the ICS.

13. The method of claim 1, wherein a first security service of a first PLC of the plurality of PLCs operates without any common cloud reputation of a second security service of a second PLC of the plurality of PLCs.

14. The method of claim 1, wherein the kernel-level agent and the security service are in communication outside of a system resource intercept.

15. The method of claim 1, further comprising determining the resource for which to intercept based on hash content.

16. The method of claim 1, further comprising:
- after the initialization stage, monitoring the ICS to determine a functionality of another resource by the kernel-level agent; and
- dynamically identifying, by the kernel-level agent, the another resource prior to intercepting a request to the another resource based on the functionality of the another resource.

17. The system of claim 7, wherein a first security service of a first PLC of the plurality of PLCs operates without any common cloud reputation of a second security service of a second PLC of the plurality of PLCs.

18. The system of claim 7, wherein the kernel-level agent and the defense service are in communication outside of a system resource intercept.

19. The system of claim 7, wherein the set of program instructions further cause the at least one microprocessor to determine the resource for which to intercept based on hash content.

20. The system of claim 7, wherein the set of program instructions further cause the at least one microprocessor to:
- after the initialization stage, monitor the ICS to determine a functionality of another resource; and
- dynamically identify the another resource prior to intercepting a request to the another resource based on the functionality of the another resource.

* * * * *